April 8, 1930.    C. H. GUNN    1,753,411
RUBBER COVERED SPRING BUMPER
Filed April 16, 1929
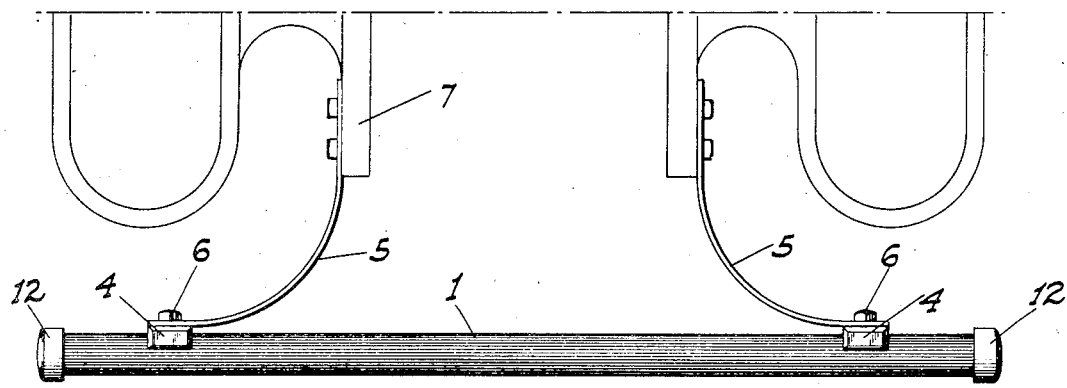
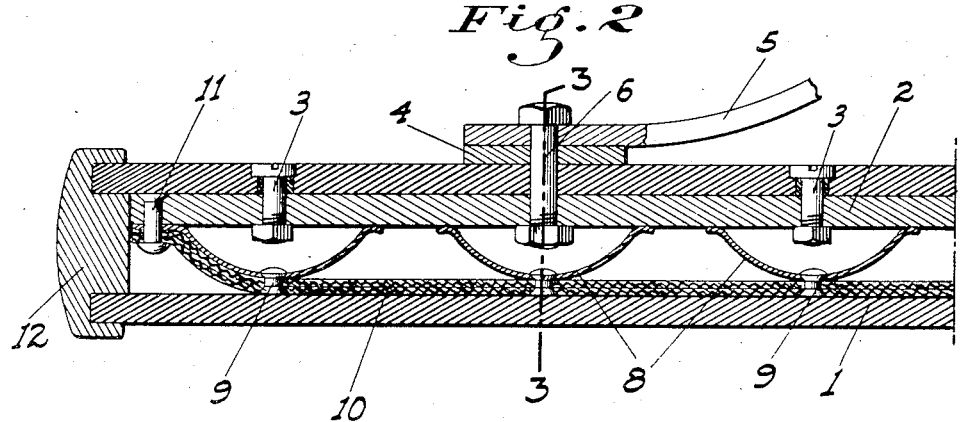
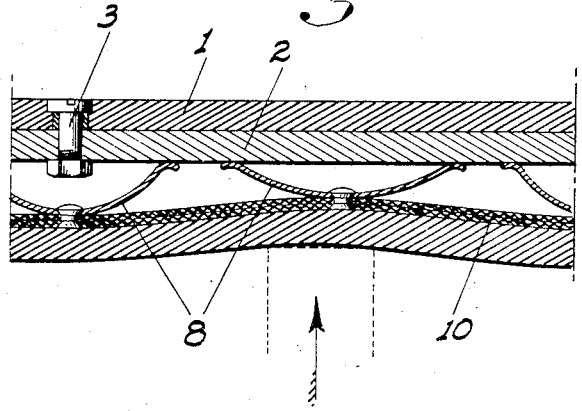
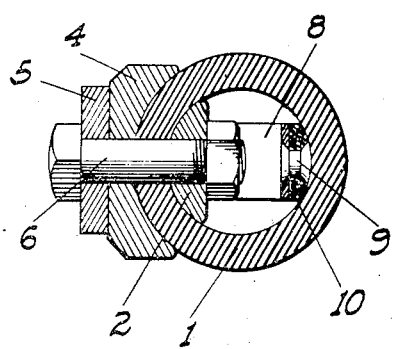
INVENTOR
C. H. Gunn
BY
ATTORNEY Patented Apr. 8, 1930

1,753,411

UNITED STATES PATENT OFFICE

CHARLES H. GUNN, OF ALAMEDA, CALIFORNIA

RUBBER-COVERED SPRING BUMPER

Application filed April 16, 1929. Serial No. 355,501.

This invention relates to automobile bumpers, my principal object being to provide a bumper of this character so constructed as to protect the car or other obstruction which is struck or bumped, as well as the car on which the bumper itself is mounted.

My bumper is constructed on the theory that such structures are never of any appreciable value in preventing damage to a car when a serious collision occurs and are mainly useful in protecting fenders and similar parts against damage from slight bumps or collisions occasioned when operating in traffic, manoeuvring in and out of parking places, and other operations. No matter how slight the impact the ordinary bumper usually scratches or distorts the fender or other part of the other car and I have particularly constructed my bumper to avoid such occurrences.

In other words not only is the exterior surface of the bumper constructed of a relatively soft and non-scratching nature, but the inherent construction of the bumper itself is such as to readily yield and absorb any light shock imparted thereto. The part of the car or other structure bumped is therefore protected while the shock of the impact is cushioned from the car on which the bumper is mounted.

A further object of the invention is to provide a bumper for the purpose which is of neat and attractive appearance and which while light has ample strength for the purpose for which it is particularly designed.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a top plan view of my improved bumper as applied to the front end of a motor vehicle.

Fig. 2 is a fragmentary sectional plan of the bumper.

Fig. 3 is a cross section taken on the line 3—3 of Fig. 2.

Fig. 4 is a fragmentary sectional plan of the bumper showing the action when striking an obstruction.

Referring now more particularly to the characters of reference on the drawings, the body of the bumper consists of a tubular member 1 of heavy but resilient rubber or similar material or composition, disposed inside the same and extending along the back and for the full length of which is a metal stiffening bar 2. This bar is flat in a vertical plane on its front face but is curved at the back to fit the bore of the body. This bar is secured at intervals along its edge to the body by bolts 3. Saddle blocks 4 engage the back of the body on the outside and toward the ends thereof and form pads against which the forward ends of the supporting bracket bars 5 rest. These brackets are secured by bolts 6 which pass through said brackets, the body and the stiffening bar. The brackets curve rearwardly and away from the adjacent ends of the body to terminations at right angles to the body where they are adapted to engage the front ends of the frames 7 of a car and to be secured thereto in the customary manner.

Inside the body and bearing at their ends against a bar 2 are a plurality of semi-elliptic spring strips 8 which are spaced apart longitudinally a sufficient distance to enable the springs to flex or flatten individually without interfering with each other. These springs at the peak of the bends or centrally between their ends are all connected by rivets 9 or the like to a heavy strap 10 of flexible material, such as leather or canvas, which is disposed between the springs and the front face of the body. Between the two opposite end springs this strap is taut and likewise throughout its extent against the interior of the body, but at its ends it follows the curvature of the end springs and is secured to the bar 2 in common with said springs by rivets 11 or the like, as shown in Fig. 2. This strap not only holds all the springs in proper spaced relation to each other without having to secure one end of each spring to the body or bar but protects the rubber of the body from direct contact with the springs such as might cause the edges of said springs to cut into and damage the same. This arrangement also allows the parts to be assembled on the bar and to be then slid endwise into the body as a single unit. The ends of the bar terminate a sufficient distance inwardly of the ends of the body to allow the plug caps 12 to be inserted into such ends. These caps are arranged to prevent the ends of the body from collapsing and also extend over the ends so as to prevent the same from being chafed from the outside. Also of course these caps or plugs conceal and protect the springs and other parts inside. These caps are preferably also made of rubber or a similar composition of a non-scratching and cushion nature.

In operation any small shock imparted to the front of the bumper at any point in its length, by reason of striking an obstruction as indicated in Fig. 4, is initially imparted to the adjacent spring which immediately flexes and cushions the shock as shown in Fig. 4. The spring strips being all connected together by the flexible strap, causes such flattening of the body to be imparted to some of the springs other than the one immediately in line with the obstruction so that the shock is distributed over a considerable portion of the length of the body. Any greater shock causes the bumper as a whole to flex rearwardly, since the steel bar 2 naturally has a certain amount of resiliency or elasticity. In addition, the curvature of the bracket bars permits the same to yield rearwardly under a heavy shock, adding to the shock absorbing action of the bumper as a whole.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A bumper including a tubular body of resilient yieldable material, a stiffening bar mounted along the back of the body, and longitudinally spaced compression springs disposed in the body at intervals, between the bar and the front face of the body to resist inward deflection of said face.

2. A bumper including a tubular body of resilient yieldable material, a stiffening bar mounted along the back of the body, longitudinally spaced compression springs disposed in the body at intervals between the bar and the front face of the body to resist inward deflection of said face, and a flexible strap connected only at its ends to the body and intermediate its ends to the various springs.

3. A bumper including a tubular rubber body, a steel bar inside and along the back of the body and secured thereto, the front face of the bar being flat in a vertical plane, and a plurality of semi-elliptic springs bearing at their ends against the flat face of the bar and extending forwardly to yieldably resist inward deflection of the front portion of the body.

4. A device as in claim 3, with means for maintaining the springs in definitely spaced relation to each other without interfering with their flexing.

5. A bumper including a tubular rubber body, a steel bar inside and along the back of the body and secured thereto, the front face of the bar being flat in a vertical plane, a plurality of semi-elliptic springs bearing at their ends against the flat face of the bar and extending forwardly to yieldably resist inward deflection of the front portion of the body, and a continuous flexible strap extending straight along the front of the body inside the same and between the body and springs and secured to the latter intermediate their ends, said strap at its ends being connected to the body.

In testimony whereof I affix my signature.

CHARLES H. GUNN.